Oct. 12, 1965

M. D. SANNER 3,212,058

NULL DEPENDENT SYMBOL RECOGNITION

Filed June 5, 1961

2 Sheets-Sheet 1

MEDFORD D. SANNER
INVENTOR.

BY D. Carl Richards

Oct. 12, 1965 M. D. SANNER 3,212,058

NULL DEPENDENT SYMBOL RECOGNITION

Filed June 5, 1961 2 Sheets-Sheet 2

MEDFORD D. SANNER
INVENTOR.

BY D. Carl Richards 3,212,058

NULL DEPENDENT SYMBOL RECOGNITION

Medford D. Sanner, Irving, Tex., assignor, by mesne assignments, to Sperry Rand Corporation, Manhattan, N.Y., a corporation of Delaware Filed June 5, 1961, Ser. No. 114,784
10 Claims. (Cl. 340—146.3)

Figure 1:
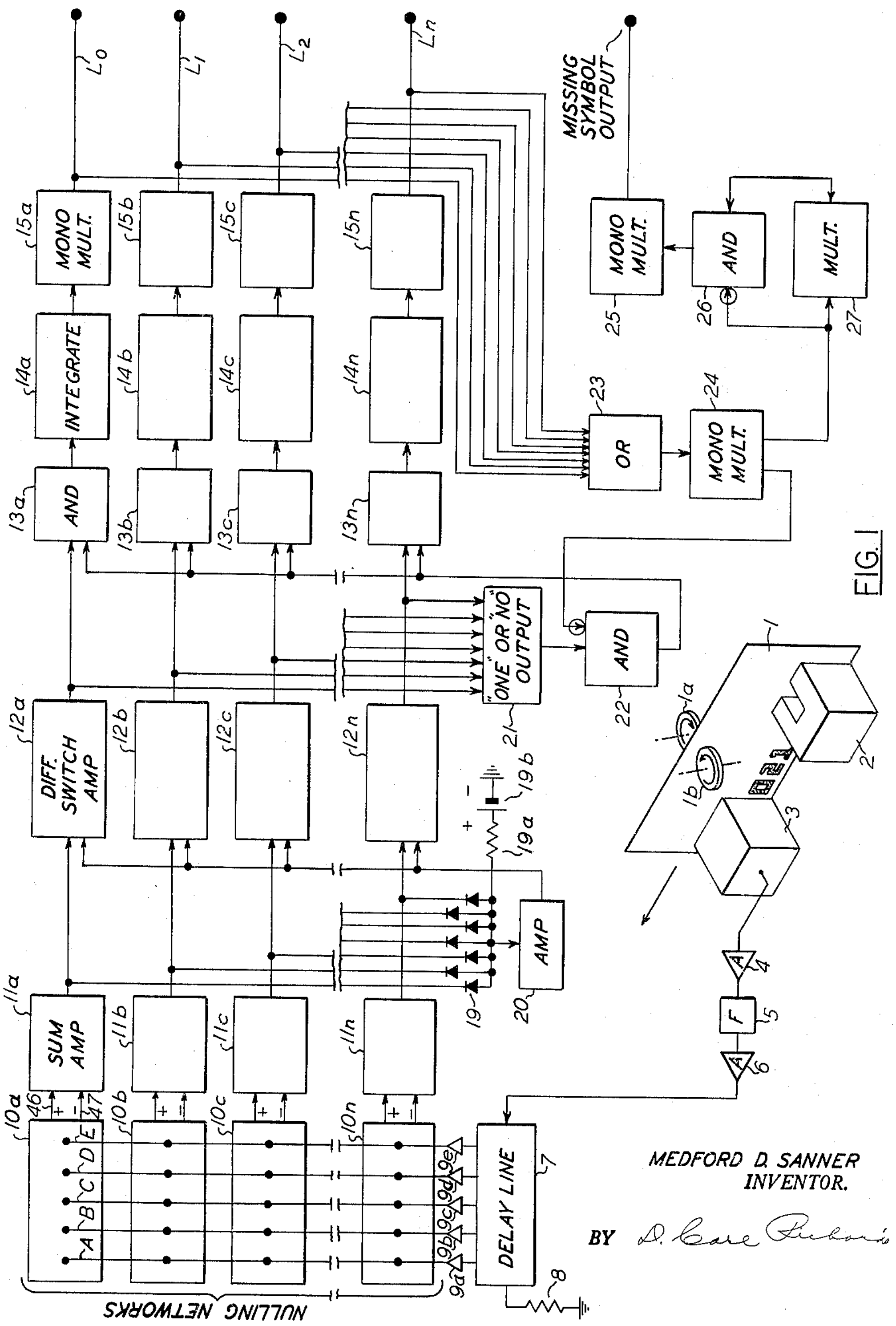

This invention relates to a method and apparatus for automatically recognizing human language symbols and, more particularly, to improved methods and apparatus for automatically recognizing letters, numerals and special symbols printed on documents, paper tapes or other materials appropriate for use at the input to high speed electronic data processing apparatus.

As modern business has increased in size and complexity, the need for automatic means for handling business documents has increased. In particular, industries involving sales, transportation, banking and the like are faced with the problem of sorting and accounting on a day-to-day basis for sales slips, tickets, checks and deposit slips, etc. in quantities such that manual handling of such business documents becomes almost a hopeless undertaking. Although several systems have been devised in working toward a solution of this problem, it appears at present that the use of human language symbols printed in magnetic ink on the documents themselves in conjunction with equipment capable of recognizing these symbols automatically offers perhaps the most practical means for minimizing the manual handling of the documents. It is in this light that the present invention has been made, eliminating some limitations inherent in character reading systems previously developed.

The present invention involves use of a transducer before which a symbol is passed to produce an electrical waveform peculiar to that symbol. This waveform is then identified to provide a recognition signal corresponding to the characteristic waveform. The waveform recognition techniques disclosed herein are applicable to other devices wherein it is desirable to identify an unknown electrical waveshape as a particular one of a plurality of waveshapes with which the apparatus is required to operate.

One factor causing difficulty in magnetic symbol reading systems of the prior art is the fact that high quality of the printing is necessary if dependable, accurate reading is to be obtained. That is to say, if the ink is too thick or too thin, or if the symbols are imperfectly formed because of voids or blobs, great difficulty is experienced in properly interpreting the waveforms produced by these symbols as they pass a magnetic transducer.

As the thickness of the ink applied in printing the symbols varies, there will result corresponding variations in the ideal or average signal in the scanning operation. Similarly, voids in the symbol will cause unexpected peaks in the output waveform in the scanning operation. Extraneous bits of magnetic material entirely outside of a printed symbol may cause entire groups of symbols to be rejected as unreadable in certain systems in which critical timing functions are related to the first bit of information to be introduced into the system from the magnetic transducer.

Another limitation of at least one type of recognition system presently known in the art is that the number of points at which each symbol-dependent waveform is examined is necessarily related to the total number of different symbols to be read by the system rather than to the common characteristics of the wave patterns as a whole. Thus, if, for instance, fourteen different symbols are to be recognized by such a system, fourteen examining points on a waveform would be required even though the characteristics of the waveforms might logically be best examined at, say, six or eight or another number of distinct points.

It is therefore a principal object of this invention to provide improved automatic symbol recognition methods and apparatus of great dynamic range capable of properly interpreting symbol-dependent waveforms.

It is another object of this invention to provide apparatus capable of recognizing symbols of substantially less than perfect form.

It is a further object of this invention to provide automatic reading apparatus capable of operating unaffected by the occurrence of extraneous bits of magnetic material among the symbols printed on the document to be read.

It is a still further object of this invention to provide for recognizing electrical waveforms in which an identification is based on comparison of a recognition signal to a constant such as zero rather than on a comparison of a signal to similar varying signals in other recognition channels.

It is still a further object of this invention to provide improved reading apparatus in which the number and location of points at which the waveforms are examined for identification are selected on the basis of best defining the individual waveforms.

In accordance with the present invention a system is provided for recognizing symbol signals. More particularly, there is provided a transducer for producing electrical signals which may include a unique waveform for each symbol. A delay line waveform sampling means is provided in circuit with the transducer for providing simultaneously a predetermined number of time-spaced voltages each representative of said electrical signals. Means are provided connected to said sampling means for providing a voltage null when said voltages are representative of the magnitudes at spaced points on one of said unique electrical waveforms.

In a more specific aspect each nulling network is provided with a pair of output lines with a first set of diodes connected at the anodes thereof to the first of the output lines and a second set of diodes connected at the cathodes thereof to the second of the output lines. A first pair of like impedances are provided for interconnecting one of the signal channels and the cathode and anode of diodes from each of the first and second sets of diodes whereas a second pair of like impedances are provided for interconnecting the second of the signal channels and said cathode and anode respectively. The ratio of one of the first impedances to one of the second impedances is the same as the ratio of amplitudes at two points respectively of opposite polarity on one of the waveforms to be identified. A plurality of impedance-diode interconnections are provided between the input and output lines where the impedances are weighted in dependence upon the peaks to be compared. A null signal is produced on both output lines of one such nulling network when a waveform corresponding to the one of the unique waveforms appears at the outputs of the delay line.

Figure 2A:
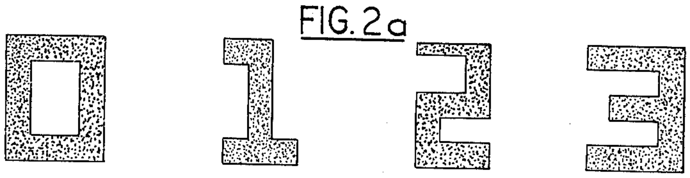
Figure 2B:
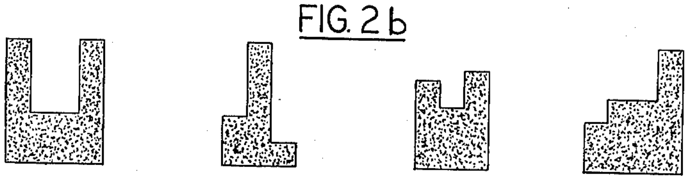
Figure 2C:
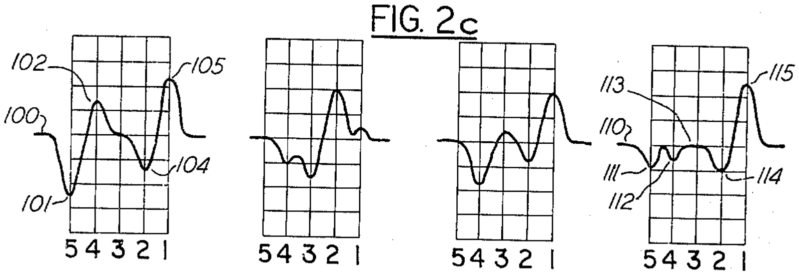
Figures 3, 4:
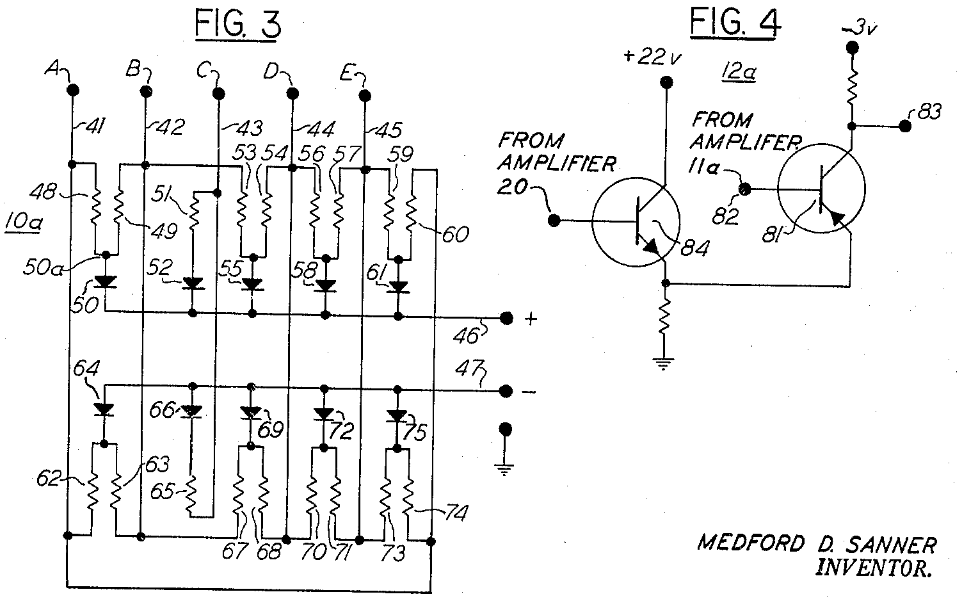

Other and further objects and advantageous features will be apparent from the following detailed description and the appended claims when read in conjunction with accompanying drawings in which:

FIG. 1 is a block diagram of apparatus employing the invention;

FIG. 2*a* illustrates symbols that may be recognized by apparatus employing the invention;

FIG. 2*b* illustrates the vertically integrated symbol areas of FIG. 2*a*;

FIG. 2*c* illustrates the electrical waveforms produced by the symbols of FIG. 2*a* passing the magnetic read head;

FIG. 3 is a schematic diagram of a representative resistor voltage-nulling network used with the invention; and FIG. 4 is a schematic diagram of a differential switching amplifier employed in the invention.

Referring now to FIG. 1, the apparatus includes means such as drive wheels 1_a_ and 1_b_ to transport symbol-bearing materials such as card 1 past the read station of the apparatus.

Document 1 on which symbols are printed in magnetic ink passes first in front of a permanent magnet 2 to magnetize to saturation the magnetic material present in the ink to erase all previous magnetic history of the document. The document 1 then passes a magnetic read head 3 of a type well-known in the art. The passage of the magnetized symbols produces a time variable voltage output from the read head 3 in response to the changes of magnetic flux that occur as various portions of the symbols pass by the read head 3. This voltage output is first amplified to a usable level by a suitable amplifier 4 and then is passed through a filter 5 which eliminates the high frequency components of the signal which are not used in identification.

The filtered signal, after further amplification in unit 6, is applied to an electrical delay line 7. The delay line, as will be more fully described hereinafter, is of sufficient electrical "length" to fully accommodate at least one complete character at the selected document speed. Taps on the delay line are provided at selected intervals to permit simultaneous examination of a number of key points of the waveforms produced by the read head 3.

For each different symbol to be identified, a voltage nulling network 10 is provided. Each network 10_a_, 10_b_–10_n_ is selected to be responsive to an ideal waveform representative of a particular symbol when perfectly printed. Each tap on the delay line 7 is connected to each of the networks 10_a_–10_n_.

The application of signals from the delay line to all of the networks 10_a_–10_n_ results in substantial output signals occurring at the output terminals thereof. However, at the instant that a signal of predetermined waveform appears at the output of the delay line the output of one of the networks 10_a_–10_n_ falls to a very low level. Identification of an unknown symbol may thus be made by a simple voltage comparison of the network outputs. More particularly, the output channel associated with the network having the lowest output is activated to transmit an indication of a given symbol.

The magnetic transducer or read head 3 is responsive to changes in magnetic flux and thus serves as a signal generating means for providing an electrical waveform characteristic of the particular symbol which is passed before the gap. Although generally similar in principle with magnetic heads used in magnetic tape and magnetic wire recorders, the head 3 is constructed with a gap length considerably greater than ordinarily used. The length of the gap must be at least as great as the height of the characters to be read. To make possible the reading of characters displaced vertically from the normal location on the document, the gap length preferably is equal to 2_h_ or 3_h_. Transducer 3, having a gap width of two mils, a gap length of ½″, and an inductance of about 40 millihenries, has been found to be satisfactory.

The signal level of the output of the read head 3 generally is very low, ranging in the order of 2 to 15 millivolts peak to peak and, hence, must undergo substantial amplification before it can be reliably identified. The signal is first amplified to a maximum level of about 3 volts peak-to-peak by a pre-amplifier 3. The amplifier 3 preferably has a low impedance output.

To reduce the high-frequency signal components produced in the output from read head 3 by small defects such as voids, ink splatter and uneven boundaries in the printed symbols, filter 5 is interposed in the signal channel. Filter 5 may include a "pi" section low pass section used in conjunction with a series capacitor to provide a band pass having 3 decibel attenuation points at 250 cycles per second and 14 kilocycles per second. The effect, as indicated above, is to substantially reduce the differences between a perfect signal waveform and the signals produced by imperfect symbols. Such differences would otherwise greatly complicate identification.

The second amplifier 6 is employed in order to increase the level of the filtered signal to a more usable amplitude. Amplifier 6 preferably has substantially flat response over the frequency band of from 10 and 23,000 cycles per second and a low impedance output of the order of 20 to 30 ohms.

The output of amplifier 6 is applied to the input of the delay line 7. The delay line employed will depend upon the characters and symbols to be read by the system. The number and spacing of the taps are related to the particular type font to be read. For purpose of illustration, a few characters from a simplified font of type are shown in FIG. 2_a_, principles disclosed herein being equally applicable to automatic recognition of other fonts of type.

Referring now to FIG. 2_a_, magnetic characters of the form shown produce signals of the waveforms shown in FIG. 2_c_. Peaks occur only at selected points in time with with reference to the leading edge of a given symbol. Symbols are designed to restrict the waveform peaks to certain selected time-locations. This greatly simplifies the design of the associated recognition circuitry.

The magnetic read head 3 is responsive only to changes in magnetic flux under the head gap and not to the total flux at any particular point. Thus, the sum of the printed vertical components of a character as illustrated in FIG. 2_d_ determines the electrical waveform characteristic of a particular printed symbol. The changing flux density resulting from passing from a portion of a symbol of one total vertical height to a portion of greater or lesser total vertical height results in generating a waveform characteristic of a particular symbol. Other than the selection of location of the delay line taps in relation to the type font employed, the requirements for the delay line 7 are neither critical nor unusual. Delay line 7 has a flat frequency response within the pass band of the filter 5 or is compensated by adjustment of tap amplifiers 9_a_–9_d_ interposed between the said delay line taps and the nulling networks 10_a_–10_n_.

The delay line 7 provides simultaneously a plurality of samples taken at predetermined time-spaced points on the signal waveform. Although other devices known in the art could be employed as sampling means (e.g., a magnetic tape loop or a magnetic drum or disk), an electrical delay line in the present state of the art offers significant economic advantages in view of the peripheral equipment necessarily employed with the magnetic devices.

For purposes of demonstrating the manner in which a delay line 7 would be employed in providing useful samples of the characters displayed in FIG. 2_a_, assume that said characters are to have a width of 0.10 inch when printed on documents and that said documents are to be transported past the magnetic transducer at a speed of 200 inches per second. It may be shown that the electrical "length" of the delay line in seconds must then be $\frac{1}{10}\times\frac{1}{200}=\frac{1}{2000}$ second or 500 microseconds. In FIG. 2_c_ there are five equally spaced points at which waveform peaks may occur. Therefore, five corresponding delay line taps are required spaced 125 microseconds apart along the delay line. The five output channels from the delay line 7 include tap amplifiers 9_a_, 9_b_, 9_c_, 9_d_ and 9_e_, respectively.

The tap amplifiers 9_a_–9_e_ serve as network drivers. They may be transistor amplifiers in the emitter follower configuration. To provide a greater signal voltage at the network inputs, amplifiers 9_a_–9_e_ may be transformer-coupled to the network input channels using transformers having a turns ratio of the order of two to one.

The output channels extending from amplifiers 9a–9e, i.e., channels A–E, are connected to each of the nulling networks 10a–10n.

In FIG. 3 nulling network 10a has been illustrated in detail. This network is designed for identifying a symbol of zero configuration as shown in FIG. 2a. This network is characterized by a construction in which two series resistor pairs are connected between selected pairs of the input lines A–E. More particularly, the juncture between resistors 48 and 49 is connected through a diode 50 to the positive output line 46 of network 10a. The resistor 48 is connected to line 41 which extends from line A. The resistor 49 is connected to line 42 which extends from line B. Similarly, the juncture between resistors 62 and 63 is connected through an oppositely poled diode 64 to the negative output line 47. Resistor 62 is then connected to the line 41. Resistor 63 is connected to line 42. Conductor 43 extending from line C is connected to output terminal 46 by way of a single resistor 51 and a diode 52. Resistor 65 and diode 66 serve to connect conductor 43 to line 47. Resistors 53 and 54 interconnect conductors 42 and 44 with the juncture between them being connected to line 46 by diode 55. Resistors 67 and 68 also interconnect conductors 42 and 44, the juncture between them being connected by way of diode 69 to line 47. Resistors 56 and 57 interconnect conductors 44 and 45 with the juncture between them being connected by way of diode 58 by line 46. Resistors 70 and 71 also interconnect conductors 44 and 45 with a connection to line 47 being provided by way of diode 72. Conductors 45 and 41 are interconnected by resistors 59 and 60 with diode 61 leading to conductor 46. A similar connection is provided by way of resistors 73 and 74 with diode 75 leading to conductor 47.

The resistor values and connections in network 10a are so selected as to cause a null voltage condition to appear on the output lines when the zero symbol of FIG. 2a is read by head 3. Whenever the zero symbol is not properly indexed in the delay line or some other character is in the delay line, whether indexed or not, current will flow to ground in one or both of the output lines 46 and 47. Other components of the hereinafter described system are provided to select a network whose output is zero by energizing the corresponding output channel. The output lines 46 and 47 have zero voltage with reference to ground by voltage nulling action in network 10a whenever a zero symbol waveform appears on input lines A–E.

It will be noted that each character waveform in FIG. 2c contains both positive and negative peaks, the waveforms being the derivative of the waveforms of FIG. 2b.

Nulling is accomplished by utilizing resistors between two of the lines A–E on which a positive peak and a negative peak simultaneously appear when an anticipated waveform is applied to the delay line 7. Inasmuch as one terminal of each pair of resistors is positive and the other terminal of each said pair is negative, current will flow in the resistors connected therebetween. At some point in the combined resistance the potential with respect to ground will be zero. By selection of the resistor values in each series pair, the zero potential point can be induced to fall at the terminal common to a given pair of resistors.

In this manner there may be overcome the most serious limitation of previous attempts to achieve character recognition through nulling. This limitation is the probability that under certain circumstances false nulls will occur as a result of offsetting positive and negative sample voltages. In the network 10a the positive recognition errors and the negative recognition errors may not cancel one another since diodes independently control currents flowing between conductors 46 and 47 to ground.

Another advantage stemming from a network configuration such as 10a is the degree to which the recognition capabilities of the system are independent of the average input signal levels. Terminals of the series resistor pairs in the various networks will show a zero voltage not only when sample voltages of an ideal magnitude and waveform are applied but also when voltages of any magnitude are applied so long as the correct proportional relationship between waveshape sampling points exists. It follows that no limitation is placed on the proper recognition of character signals of very widely varying average amplitudes so long as they retain proper relative proportions.

This system has been found to be capable of operation over a dynamic range of more than 20 to 1. This is a significant improvement over systems presently known in the art.

The procedure used in the design of a character nulling network will be described making use of the waveform of the "zero" shown in FIGURE 2a. It is noted that the characteristic waveform 100 contains four peaks, two positive peaks 102 and 105 and two negative peaks 101 and 104. Corresponding peak voltages simultaneously appear on delay line output channels B, E, A and D, respectively.

The initial step is to determine which peak comparisons should be made in order to best distinguish the waveform. To a considerable extent this may be dependent upon the shapes of waveforms for other symbols which the network must distinguish. In the present case, however, the shape of the waveform is such that no opportunity for the exercise of such selection exists inasmuch as the four peaks are equally divided between positive and negative peaks and are all of relatively large magnitude. In such an instance, all possible comparisons should be made. Thus, peak 101 will be compared with peak 102, peak 102 with peak 104, peak 104 with peak 105, and peak 105 with peak 101. In addition, provision will be made to require the presence of a zero voltage on channel C by making connections from line 43 directly to the output lines 46, 47 as through series resistors 51, 65 and diodes 52, 66.

In contrast, the waveform 110 of the symbol "3" contains one positive peak 115 and three negative peaks 111, 112 and 114. In such a case, comparisons would be made between the strong positive peak 115 and each of the three lesser negative peaks 111, 112 and 114. Additionally, provision would again be made for requiring the presence of zero voltage at point 113 as described previously. Inasmuch as the single strong positive peak 115 is the most distinguishing characteristic of the waveform, a weighting technique to be presently described will be employed to increase the relative significance of this peak.

The second step in the design of the network will be the determination of the precise resistor values required to effect the desired nulls at the common terminal of the series resistor pairs. With all waveforms plotted on the same scale one resistance value is selected to correspond to the relative size of the largest peak in the waveform. Other peaks in the waveform will be of lesser magnitudes and resistors correspondingly lower in value will be utilized in the peak nulling circuit. Among the factors influencing the selection of the basic resistance value corresponding to the largest peak in a given waveform are (1) the permissible loading of the network driving amplifiers, and (2) the desired network output line current when recognition does not occur. For circuit parameters above noted basic resistance values will be in the neighborhood of 15,000 to 60,000 ohms.

When the basic resistance valve has been selected, the other comparison resistance values may be determined. More particularly referring to the zero character in FIG. 2a, it will be noted that the largest peaks in the waveform 100 have relative values of 2½ units. Asseming that on the basis of the permissible loading of the network driving amplifiers and the desired network output currents a basic resistance value of 25,000 ohms has been selected, the value of the resistors associated with the smaller waveform peaks 102 and 104 will be 15,000 ohms. In any given nulling network to which voltage samples of opposite polarity will be applied for recognition, the two resistive elements forming a connection between lines A—E will have values proportional to the voltage to be applied to the particular line to which a given element is directly connected. That is to say, a resistor in a given pair will have a value bearing the same proportion to the total resistance of the pair as the voltage to be applied to the line to which said resistor is directly connected bears to the total voltage difference to be applied to the two lines between which said pair of resistances is connected.

The final form of the network responding to the waveform 100 produced by the "zero" symbol is as shown in FIG. 3. The polarities of the diodes such as diodes 50 and 64 are such that the positive and the negative non-recognition signals are respectively applied to the positive and negative output lines of the network. Thus, the cathodes of diodes 50, 52, 55, 58, 61 are connected to the positive voltage output line 46, the respective anodes being connected to the associated nulling resistors. Current may then flow only from the resistor junction to the output line. The anodes of diodes 64, 66, 69, 72, 75 are connected to the negative voltage output line 47, the cathodes being connected to the resistor junctions, so that current may flow from the output line to the resistor junction.

In operation the nulling circuit 10 performs as follows: From the waveform 100 for the zero symbol it was determined that the sample voltages on conductor lines 41 and 42 of the network from lines A and B of the delay line would have relative values of 2½ units negative and 1½ units positive, respectively, at the time at which the waveform was properly positioned in the delay line. Therefore, if resistors 48 and 62 connected to the input line 41 were of 25,000 ohms as previously discussed, the resistors 49 and 63 would be 15,000 ohms each to satisfy the necessary ratio. If voltage samples from a particular waveform having values in another magnitude range, for example, of 5 volts negative and 3 volts positive, the midpoints of both resistor pairs 48–49 and 62–63 would be at zero voltage and, hence, no current would flow in either diode 50 or diode 64.

Assuming that sample voltages of other magnitudes but bearing the same ratio are applied to the input lines of the network, no currents would flow in the output lines 46 and 47. As will be discussed hereinafter, an output would be generated from the system identifying the symbol as a "zero."

If voltage samples bearing some relationship other than in waveform 100 appear on lines A–E, current would flow in the output lines 46 and 47. For example, if voltages of −3 and +5 appear on lines 41 and 42 respectively, the voltage at the junction 50*a* between the two resistors 48 and 49 would be 2 volts and current would flow in the positive output line 46. No current would flow in the negative output line 47 because the diode 64 would not conduct in this direction. If voltages of −14 and +2 appear, the junction 50*a* would be at −4 volts and current would flow in the negative output line 47. No current would flow in the positive line because of the diode 50. Current will flow in one or both of the output lines of any nulling network at such times as voltages applied thereto do not conform with the ratios existing in the interline resistors.

Operation of the system can be improved by "weighting" certain networks to provide non-recognition output signals from one network that conform as closely as possible to the non-recognition output signals of all other networks. As may be seen from comparing waveforms 100 and 110, FIG. 2*c*, waveform 110 has a significantly lower energy content than waveform 100. Nulling networks constructed without regard to this energy content will produce lower levels of non-recognition signals when waveforms other than the nulling waveforms are applied. In general the non-recognition output of a network will be increased by resistances of a lower range in one network than in a companion network. In a network for identifying waveform 110 a basic resistance value of the order of 18,000 ohms would be chosen to correspond to the strong peak 115 rather than the 25,000 ohms resistance value selected for peaks 101 and 105 in waveform 100.

The positive and negative output lines 46 and 47 of nulling network 10*a* are connected to the respective positive and negative inputs of a differential summing amplifier 11*a*. The input impedances to amplifier 11*a* are very low whereas the source impedances for the non-recognition signals present on the lines 46 and 47 are comparatively high. Summing amplifiers 11*b*–11*n* are provided for networks 10*b*–10*n*, respectively. One of the input signals is inverted in amplifier 11*a* and then added to the other input signal and amplified. Output signals proportional to the sum of the magnitudes of the input signals irrespective of their signs are thus developed at the outputs of amplifiers 11*a*–11*n*. Each such output signal represents the degree to which each of the waveforms effectively built into the networks 10*a*–10*n* conforms to the waveform from the delay line at any given time. Thus, a waveform which conforms closely to one of the stored waveforms of the networks may be identified by the resulting low output from one differential summing amplifier.

The remainder of the character reading system relates to the selection of the lowest output signal from the summing amplifiers 11*a*–11*n* and to energizing the symbol output line associated therewith together with additional functions, assuring that one and only one output line is so energized for a given symbol input.

The output of amplifier 11*a* is connected to one input of a differential switch circuit 12*a*. Switch circuit 12*a* permits a signal applied at one of its inputs to be passed or not passed by the circuit depending on the voltage applied to its second or control input. Amplifiers 11*b*–11*n* similarly are connected to switch circuits 12*b*–12*n*.

A schematic diagram of a suitable switch circuit is shown in FIG. 4. A transistor 81 is used as the switching element. A signal applied at the input terminal 82 to the base of transistor 81 will appear at the output terminal 83 at the collector of the transistor, only if it is lower in magnitude than the applied control voltage. The control voltage is applied to the emitter of transistor 81 from circuitry represented by transistor 84 which selects the lowest voltage output from all the summing amplifiers 11*a*–11*n* and multiplies said lowest voltage output by a predetermined factor.

More particularly, the output channels of the summing amplifiers 11*a*–11*n* are separately connected to a diode gate 19. The gate 19 includes a diode in each line. The anodes of the diodes are connected to a common conductor which leads to a resistance 19*a* which in turn is connected to the positive terminal of a battery 19*b*. The negative terminal of battery 19*b* is connected to ground. The voltages on the output channels of the summing amplifiers are positive with respect to ground. The battery 19*b* effectively biases the diodes in the gate 19 so that the output voltage appearing across resistor 19*a* and applied to amplifier 20 corresponds in magnitude to the lowest of the voltages appearing at the outputs of the summing amplifiers 11*a*–11*n*.

An amplifier 20 is provided which multiplies the voltage output of said gate by a constant factor. Adjustment of the factor for multiplying the voltage output from gate 19 permits control over the error-reject ratio as will be more fully explained. The multiplied output of the gate 19 is applied from amplifier 20 to each of the differential switching amplifiers 12*a*–12*n*. This provides the control voltage applied to the emitters of transistors such as transistor 81, FIG. 4.

One system output line $L_o$–$L_n$ is to be energized when one and only one of the differential switching amplifiers 12a–12n is properly keyed or conditioned. However, as may be seen from the above, the differential switching amplifiers require that the output of one of the summing amplifiers 11a–11n be less than the output of any one of the remaining summing amplifiers by a factor equal to the gain of the amplifier 20. That is to say, assuming a gain in amplifier 20 of two, a summing amplifier output of 2.5 volts (indicating a rather poor degree of conformity between the waveform and the resistor network) will be allowed to cause energization of the corresponding symbol output line only if the next lowest summing amplifier output is greater than 5 volts (2½ volts times the multiplying factor of 2). In a case in which the lowest summing amplifier output is as low as about 0.10 volt, the corresponding symbol output line will be energized if the next lowest summing amplifier output is greater than 0.20 volt.

It should be noted at this point that the magnitude of any particular summing amplifier output voltage is determined (1) by the relative energy content of the character waveform in the delay line, and (2) by the degree of conformity of the waveform to a network. Thus, a low summing amplifier output of 0.20 volt results from either a high degree of conformity of a particular waveform or a low degree of conformity of a low energy waveform. For this reason, in a particular case in which the lowest summing amplifier output is of the order of "tenths of a volt" the next lowest output might be in one case of the order of 6 or 8 volts and in another be only slightly more than twice the lowest output. The use of the multiplying amplifier having a constant gain makes possible the selection of a particular output channel as an indication of the identity of the unknown waveform on the basis of a voltage increment proportional to the signal level in question. This is in contrast with operations based on a constant required voltage difference. It is through this means that the system is able to recognize waveforms of great dynamic range without adjustment.

Even though the system for reading magnetic ink symbols disclosed herein is more tolerant of imperfectly printed symbols than prior systems, there will occur in some situations printing imperfections that tend to cause the system to reject a document containing the symbols or read such symbols erroneously. In most instances it is desirable to reject such a document rather than read it incorrectly. As stated previously, the gain of the multiplying amplifier 20 can provide a considerable degree of control over the number of errors made by the system inasmuch as a high multiplying factor will cause more rejects for errors among questionable symbols, whereas a low multiplying factor will cause fewer documents to be rejected, although more errors will be made.

For example, it is apparent that if the multiplying factor were set to an unusually low value such as 1.2 to 1 there would be a strong likelihood that certain distorted waveforms would be incorrectly identified inasmuch as there would be a high probability that for some point during the passage of the waveform through the delay line, output of one of the summing circuits 11a–11n would fall to a value such that the next lowest summing circuit output voltage would be at least 1.2 times as great. This would condition the differential switch circuits 12a–12n for the reading of such a waveform. Few, if any, documents would be rejected since any given waveform would in all probability be "read" as the symbol whose waveform was most closely duplicated. On the other hand, if the multiplying factor is set to a very high value, such as 5 to 1, the system would become virtually immune to reading error from distorted waveforms. The requirement that a summing circuit output be less than the next lowest output by a factor of 5 before the switching circuits could be conditioned for reading would cause a document to be rejected unless all symbols on the document produced waveforms conforming substantially to the built-in waveforms in networks 10a–10n. Obviously, in such a case, many readable documents would be rejected even though no errors were made.

The differential switch amplifiers 12 are constantly turned on and off in various combinations as new waveforms enter the delay line. However, until the waveform is so positioned in the delay line as to cause a high degree of conformity to exist between the waveform and one of the resistor networks, no single summing amplifier output voltage will be as close to zero as required by amplifier 20. Hence, a plurality of switches will be in a keyed condition at all times. However, only when a single one of the summing amplifier outputs drops to a magnitude lower than any other such output divided by the gain of amplifier 20 will one output line $L_o$–$L_n$ be energized.

More particularly, the output of the differential switch amplifiers 12a is connected to one of two input channels of gate 13a. Similarly amplifiers 12b–12n are connected to "and" gates 13b–13n. The second set of input channels of gates 13a–13n are control channels which are energized from a common circuit which opens the gates 13a–13n when and only when no more than one of the differential switch amplifiers 12a–12n is in the keyed condition.

In FIG. 1 the outputs of the amplifiers 12a–12n are also each connected to a resistive summing circuit 21. Summing circuit 21 is so devised that it will produce an output voltage when no more than one (i.e., either one or none) of its input channels is energized. Amplifier 21 is the "single or no output" detector. The output of the detector 21 is fed to an input of a two input "and" gate 22.

The second input of gate 22 is fed by an output of one-shot multivibrator 24 which is fired by a symbol output signal being produced on any of the output lines $L_o$–$L_n$. It should be noted that the second input is of the "inhibit" type in which gate 22 is normally open but is closed by the application of a signal to the input. The output of the "and" gate 22 connects in parallel the control inputs of each of the gates 13a–13n. The detector circuit 21 allows gate 22 to produce an output only when one or none of the character channels is energized. The occurrence of a signal at the output of gate 22 is also dependent upon the absence of any output signal from multivibrator 24 which output signal, applied to an inhibit input channel of the gate 22, provides a blanking signal for the system. One of the gates 13a–13n will be enabled only when one and only one of said channels is energized by a recognizable symbol waveform from the delay line 7.

No more than one of the "and" gates 13a–13n can pass a signal in a particular channel at any one time inasmuch as the gates 13a–13n as a group are not keyed unless no more than one of the differential switch amplifiers 12a–12n is in the keyed condition.

Gate 13a is connected to an integrating circuit 14a of a type known in the art. Circuit 14 provides a delay period before the integrator output voltage builds up to a point sufficient to fire a one-shot multivibrator 15 to which integrator 14a is connected. The delay period, which may be of the order of five to ten microseconds in time, is introduced to insure that the signal causing the energizing of a character channel, ostensibly the recognition of a valid electrical waveform representing a character, is of a substantial nature and not a spurious noise pulse or other transient condition. Gates 13b–13n are connected to integrators 14b–14n, respectively, which in turn are connected to multivibrators 15b–15n.

The one-shot multivibrators 15a–15n serve as symbol output devices, providing a standard length output pulse that is not dependent upon the length of the recognition pulse present in the symbol channel. The period of the multivibrator may be of any convenient value that is less than the time elapsing between the passage of successive characters beneath the read head 3. A period of between ten and fifty microseconds is usable with most devices energized by lines L*o*–L*n*.

A connection is made from each of the symbol output lines L*o*–L*n* to an input of an "or" gate 23 which produces an output signal when any one of the symbol multivibrators 15*a*–15*n* is fired. The output of gate 23 is in turn applied to the input of another one-shot multivibrator 24 which produces a blanking signal that prevents the system from producing another symbol output pulse (as a result of "reading" noise, reflections, ghosts, etc.) until sufficient time has passed to allow the succeeding symbol waveform to approach the reading position in the delay line. At a document speed of 200 inches per second where symbols are spaced so that leading edges of characters are 0.20 inch apart, a blanking time of the order of 350 microseconds might be used. This corresponds to about 0.70 of a character width. Blanking of the system is effected by connecting the output of the one-shot multivibrator 24 to an inhibit input of "and" gate 22, thereby disabling the gate 22. Consequently, all of the "and" gates 13*a*–13*n* are keyed off for the duration of the blanking pulse.

A second output of multivibrator 24 is applied to respective inputs of an astable multivibrator 27 and an "and" gate 26. Circuits 26 and 27 together with a one-shot multivibrator 25 comprise a "missing symbol detector" circuit. The multivibrator 27 is of the free-running type. Periodically it produces a short output pulse. Intervals between such output pulses are determined by the circuit constants. In this application, pulses of 4 to 8 microseconds duration occurring at intervals of about 500 microseconds would be desirable. Additionally, multivibrator 27 is triggered by the application of the blanking pulse from multivibrator 24 regardless of the point in the astable cycle at which the input pulse is applied. This permits the astable device 27 is be synchronized with the blanking signals. The output of the astable multivibrator 27 is connected to a second input of the "and" gate 26. The output of the gate 26 is connected to the input of one-shot multivibrator 25. Line 25*a* leading from the multivibrator 25 is the "missing character" output line of the system.

In operation, a pulse from one-shot multivibrator 24 (the blanking generator) triggers the astable multivibrator 27 and at the same time disables "and" gate 26 by the application of said pulse to an inhibit input of gate 26. Thus, for the duration of the blanking pulse, "and" gate 26 is closed to the passage of the continuously recurring pulses originating in the astable multivibrator 27. The duration of the blanking pulse is of the order of 350 microseconds whereas the repetition interval of the astable multivibrator is of the order of 500 microseconds. Therefore, after the expiration of the blanking pulse, "and" gate 26 will pass the next astable multivibrator pulse on to the input of the output multivibrator 25, thereby generating a "missing symbol" output signal unless, before the astable multivibrator has "fired" again, another blanking pulse has been generated by the recognition of a second symbol. The "missing symbol" circuitry provides an output indication in any case where a recognized character is not followed immediately by a second symbol on the printed document being read and continues to provide "missing symbol" signals at 500 microsecond intervals until another character is read. The circuitry to which the output signals of the system are fed preferably is capable of determining, by being pre-programmed with data as to the arrangement that symbols will appear on the documents being read, which "missing symbol" signals actually represent cases of failure to recognize a symbol waveform and which of such signals are generated as a result of spaces between symbols on the documents or gaps in time between documents.

From the foregoing it will be seen that there is provided an apparatus for recognizing symbol signals where a signal generating means is employed for producing electrical signals which may include in time sequence a different unique waveform for each of a plurality of symbols. A waveform sampling means such as a delay line is provided in circuit with the signal generating means for providing simultaneously a predetermined number of time-spaced voltages each representative of the electrical signals. A plurality of voltage nulling networks are provided for interconnecting the output line from the delay line and a plurality of pairs of null output lines. In effect, a waveform corresponding with signal components of each of the unique waveforms is built into one of the nulling networks by weighting of the resistances in the positive and negative channels leading to positive and negative output lines. Only when a waveform is applied to the delay line and is in registration with the pickoff points which correspond to the weighted signal paths will a null appear in the output of the system. The output of the various nulling networks is then controlled to make certain that one and only one symbol will be indicated for utilization at the output of the system by suitable peripheral or utilization equipment.

In the foregoing description an electrical delay line has been indicated as preferable for use in the system embodying the present invention. It will be readily recognized that other types of delay lines such as a magnetic delay line would be satisfactory for providing the necessary output signals. Delay lines of the latter type are known in the art. Generally they employ a magnetic recording drum having a single input and a plurality of pickups spaced around the periphery of the drum at such points as to provide the necessary delay between sample voltages. Furthermore, while the invention has been described in connection with recognition of symbols printed in magnetic ink on documents such as bank checks and the like, it will be recognized that the photographic records having symbols of the type illustrated in FIG. 2 could be utilized as to vary light transmission in a suitable multichannel reader having detectors of light sensitive variety. Thus, having described the invention in connection with certain specific embodiments thereof, it is to be understood that further modifications may now suggest themselves to those skilled in the art and it is intended to cover such modifications as fall within the scope of the appended claims.

What is claimed is:

1. In a symbol recognition system the combination which comprises a reading channel, delay means connected to said reading channel for translating a given waveform appearing on said reading channel into a plurality of signals, a plurality of sensing channels leading from said delay means wherein said signals separately appear and differ one from the other in absolute magnitude in dependence upon the degree of conformity of said given waveform with different predetermined patterns characterizing said sensing channels, a multiplying network connected to said sensing channels selectively responsive to all of said signals for producing an output proportionately higher than the input thereto of lowest magnitude, and a control means connected between the output of said multiplying network and all of said sensing channels for selectively transmitting only the particular one of said plurality of signals having the lowest magnitude.

2. In a symbol recogniton system for analyzing an electrical signal which may include unique time-spaced waveforms characterized by different combinations of peaks of positive and negative polarities and of differing amplitudes to represent different symbols in an intelligence-bearing series, the combination which comprises a delay line having an input circuit to which said electrical signal is applied and a plurality of output signal channels on which there may simultaneously appear voltages corresponding in polarity and amplitude with said peaks as different symbol waveforms are applied to said delay line, a plurality of adding networks interconnecting said signal channels and each adapted to produce a pair of output signals representative of the positive and negative sums of a plurality of different pairs of said voltages, said networks being in number equal to the number of said symbols and each having different sets of pairs of impedances representative in magnitude of the relative magnitude of different pairs of the positive and negative peaks in a given symbol waveform, and means connected to all said adding networks and responsive to the output of lowest value from one adding network to indicate the presence in said delay line of one of said unique waveforms.

3. Apparatus for recognizing intelligence-bearing symbols where said symbols occur as characteristic electrical waveforms which are unique for each symbol to be recognized comprising sampling means for receiving any one of said waveforms and, in response thereto, providing a predetermined number of samples of said waveforms, a plurality of waveform nulling means connected to said sampling means and each adapted to produce a substantially zero output when waveform samples corresponding to a particular predetermined waveform are applied thereto, a plurality of identical symbol channels each connected to one of the said nulling means, multiplying means having a plurality of inputs each connected to one of the said nulling means for providing an output signal having a value equal to the lowest input signal thereto multiplied by a predetermined constant factor, gating means in each of said symbol channels connected to said multiplying means in which signals in each of the said symbol channels are permitted to pass only if such signals are of lower value than the multiplied output of said multiplying means, single output detecting means having a plurality of inputs each connected to one of the said gating means for providing an output signal at such time as one and only one of the said gating means is operated, and a second gating means in each symbol channel, each of said second gating means having an input connected to the output of said single output detecting means whereby a signal in the corresponding symbol channel may be passed only if a signal is present in one and only one of the said symbol channels.

4. Apparatus for recognizing intelligence-bearing symbols comprising signal generating means for producing, in response to each symbol to be recognized, a signal including a unique electrical waveform characteristic of said symbol, filtering means adapted to receive electrical signals from said signal generating means and attenuate predetermined high frequency components of said signals, amplifying means connected to said filtering means for increasing the amplitude of the said signals, sampling means connected to said amplifying means for receiving said signal and providing simultaneously a plurality of samples from predetermined time-spaced points on said waveform, a plurality of nulling means connected in parallel to receive waveform samples from said sampling means, said nulling means comprising a plurality of input lines, a positive voltage output line, a negative voltage output line, first and second series resistor pairs connected between selected pairs of said input lines, diodes connected between the juncture of series resistor pairs and one said output line, diodes connected between the juncture of other series resistor pairs and the other said output line, a summing circuit connected to each said positive output line and negative output line of each said nulling means to provide output signals indicative of the sums of the magnitudes, irrespective of sign, of the voltages from each said nulling means, a symbol channel connected to each said summing circuit, each symbol channel including a switching circuit having an output and a first input and a second input, said first input being connected to the output of a summing circuit, a symbol gate having an output and a first "and" input and a second "and" input, the first said "and" input being connected to the output of said switching circuit, an integrating circuit having an output and an input which is connected to the output of said gate, an electrical pulse producing circuit having an input which is connected to the output of said integrating circuit, and a symbol output line connected to the output of said pulse producing circuit, a diode gate having a plurality of inputs each of which is connected to the output of one of the summing circuits, an amplifying circuit connected to said diode gate and connected at its output to each said second input of each said switching circuit, a second summing circuit connected to the output of each said switching circuit, an "and" gate having a first input connected to said second summing circuit, a second input and an output which is connected to the second input of each said symbol gate, and symbol output detecting means having a plurality of inputs each connected to one symbol output line and an output connected to the second input of said "and" gate.

5. Apparatus for presenting automatically an electrical identification of human-language symbols comprising:

(a) source means for generating an electrical signal including a waveshape characteristic of a symbol to be identified,
(b) a sensing network for each symbol to be identified having positive and negative output lines,
(c) means for applying a waveshape from said source means simultaneously to all said sensing networks,
(d) means for generating output signals from each sensing network representative of the absolute magnitude of the sum of the signals on said positive and negative output lines, and
(e) means for detecting which of the said output signals is the smallest to provide an electrical identification of said symbol.

6. Apparatus for presenting automatically an electrical identification of human-language symbols comprising:

(a) source means for generating an electrical waveshape characteristic of a symbol to be identified,
(b) sensing networks, one for each symbol to be identified, each network having means for comparing positive and negative excursions of said waveshape with positively poled, selectively weighted circuits and negatively poled, selectively weighted circuits respectively to produce positive and negative comparison signals on output lines leading therefrom,
(c) means for applying a wavershape from said source means to all the sensing networks,
(d) means for generating an output signal from each sensing network representative of the absolute magnitude of the combined comparison signals on said output lines thereof, and
(e) means for detecting which of the output signals is the smallest to provide an electrical identification of said symbol.

7. Apparatus for presenting automatically an electrical identification of human-language symbols comprising:

(a) source means for generating an electrical waveshape characteristic of a symbol to be identified,
(b) a sensing network for each symbol to be identified having multiple input lines and positive and negative output lines with a plurality of weighted polarized comparison paths each interconnecting pairs of said input lines and one of said output lines for comparing positive and negative excursions of said waveshape with positively poled, selectively weighted circuits and with negatively poled, selectively weighted circuits respectively to produce positive and negative comparison signals on said output lines,
(c) means responsive to said source means for applying a waveshape from said source means simultaneously to all of said sensing networks, (d) means responsive to output signals from each sensing network for generating conditions representative of the absolute magnitude of the combined signals on the positive and negative output lines leading from each network, and (e) means for detecting which of the said conditions is the smallest to provide an electrical identification of said symbol.

8. A system for identifying unique symbol wave forms in an electrical input signal which comprises:

(a) means for simultaneously producing a plurality of sample signals representative of predetermined time-spaced portions of said input signal, (b) means for generating a first condition which varies in proportion to the amount by which the positive peaks of a set of selected pairs of said sample signals exceed the negative peaks thereof, (c) means for generating a second condition which varies in proportion to the amount by which the negative peaks of said set of selected pairs of said sample signals exceed the positive peaks thereof, and (d) means for generating an output function which varies in accordance with the absolute magnitude of the combined first and second conditions.

9. The method of identifying a unique symbol wave form in a time varying input signal which comprises:

(a) simultaneously producing a plurality of sample signals representative of time-spaced portions of said input signal, (b) generating a first condition representative of a first polarity summation of differences between selected pairs of said sample signals weighted in dependence upon said symbol wave form, (c) generating a second condition representative of a second polarity summation of sense opposite said first polarity summation of said weighted differences between said plurality of selected pairs of said sample signals, and (d) generating an output condition representative of the absolute magnitude of said first condition combined with said second condition.

10. The method of identifying unique symbol wave forms in an electrical input signal which comprises:

(a) simultaneously producing a plurality of sample signals representative of time-spaced portions of said input signal, (b) generating a first condition representative of a first polarity summation of differences between selected pairs of said sample signals having a first weighting which is dependent upon one of said symbol wave forms, (c) generating a second condition representative of a polarity summation of sense opposite said first polarity summation of said differences between said plurality of selected pairs of said sample signals of said first weighting, (d) generating a third condition representative of a first polarity summation of differences between selected pairs of said sample signals having a second weighting dependent upon a second of said sample wave forms, (e) generating a fourth condition representative of a polarity summation of sense opposite said first polarity summation of said differences between said plurality of selected pairs of said sample signals of said second weighting, (f) generating a first output condition representative of the absolute magnitude of the sum of said first condition and said second condition, (g) generating a second output condition representative of the absolute magnitude of the sum of said third condition and said fourth condition, and (h) comparing said first output condition and said second output condition for selection of the output condition of the lowest magnitude.

References Cited by the Examiner

UNITED STATES PATENTS

| | | | |
|---|---|---|---|
| 2,728,866 | 12/55 | Edwards | 307—88.5 |
| 2,752,489 | 6/56 | Aigrain | 328—146 |
| 2,924,812 | 2/60 | Merritt et al. | 340—146.3 |
| 2,927,303 | 3/60 | Elbinger | 340—146.3 |
| 2,961,649 | 11/60 | Eldredge et al. | 340—146.3 |
| 2,979,695 | 4/61 | Tyrlick et al. | 207—88.5 |
| 2,994,062 | 7/61 | Chiapuzio, et al. | 340—146.2 |
| 3,114,132 | 12/63 | Trimble | 340—146.3 |

MALCOLM A. MORRISON, *Primary Examiner.*